United States Patent

Dries

[11] Patent Number: 5,938,803
[45] Date of Patent: Aug. 17, 1999

[54] CYCLONE SEPARATOR

[75] Inventor: Hubertus Wilhelmus Albertus Dries, Amsterdam, Netherlands

[73] Assignee: Shell Oil Company, Houston, Tex.

[21] Appl. No.: 08/931,543

[22] Filed: Sep. 16, 1997

[51] Int. Cl.$^6$ .................................................. B01D 45/12
[52] U.S. Cl. .............................. 55/337; 55/345; 55/349; 55/398; 55/459.1
[58] Field of Search ............................ 55/337, 345, 346, 55/349, 398, 459.1

[56] References Cited

U.S. PATENT DOCUMENTS

| | | | |
|---|---|---|---|
| 4,229,194 | 10/1980 | Baillie . | |
| 4,426,212 | 1/1984 | Zacher | 55/345 |
| 4,547,341 | 10/1985 | Weber | 55/345 |
| 4,904,281 | 2/1990 | Raterman | 55/345 |
| 5,362,379 | 11/1994 | Helstrom . | |

FOREIGN PATENT DOCUMENTS

| | | |
|---|---|---|
| 488549A1 | 11/1991 | European Pat. Off. . |
| 2281791 | 3/1976 | France . |
| 4136935 | 10/1994 | Germany . |

OTHER PUBLICATIONS

EPC Search Report dated Dec. 15, 1997.

Primary Examiner—Jay H. Woo
Assistant Examiner—Minh-Chau T. Pham

[57] ABSTRACT

A cyclone separator is disclosed having a vertical housing (2), an opening at its lower end (4), provided with a cover (5) at its upper end having a central opening (8), an inlet duct (10) for tangential entry of a mixture of gas and catalyst particles from the outlet (12) of a riser reactor (15) of a fluidized-bed catalytic cracking plant, a particles discharge duct (16) communicating with the open lower end (4) of the vertical housing (2), and a gas outlet duct (18) having a vertical section (20) which extends through the central opening (8) in the cover (5), which cyclone separator (1) further having an open-ended pipe (23) arranged in the central opening (8) to define an annular gas inlet conduit (25) between the vertical section (20) and the open-ended pipe (23), and swirl imparting means (30) arranged in the annular gas inlet conduit (25).

1 Claim, 1 Drawing Sheet

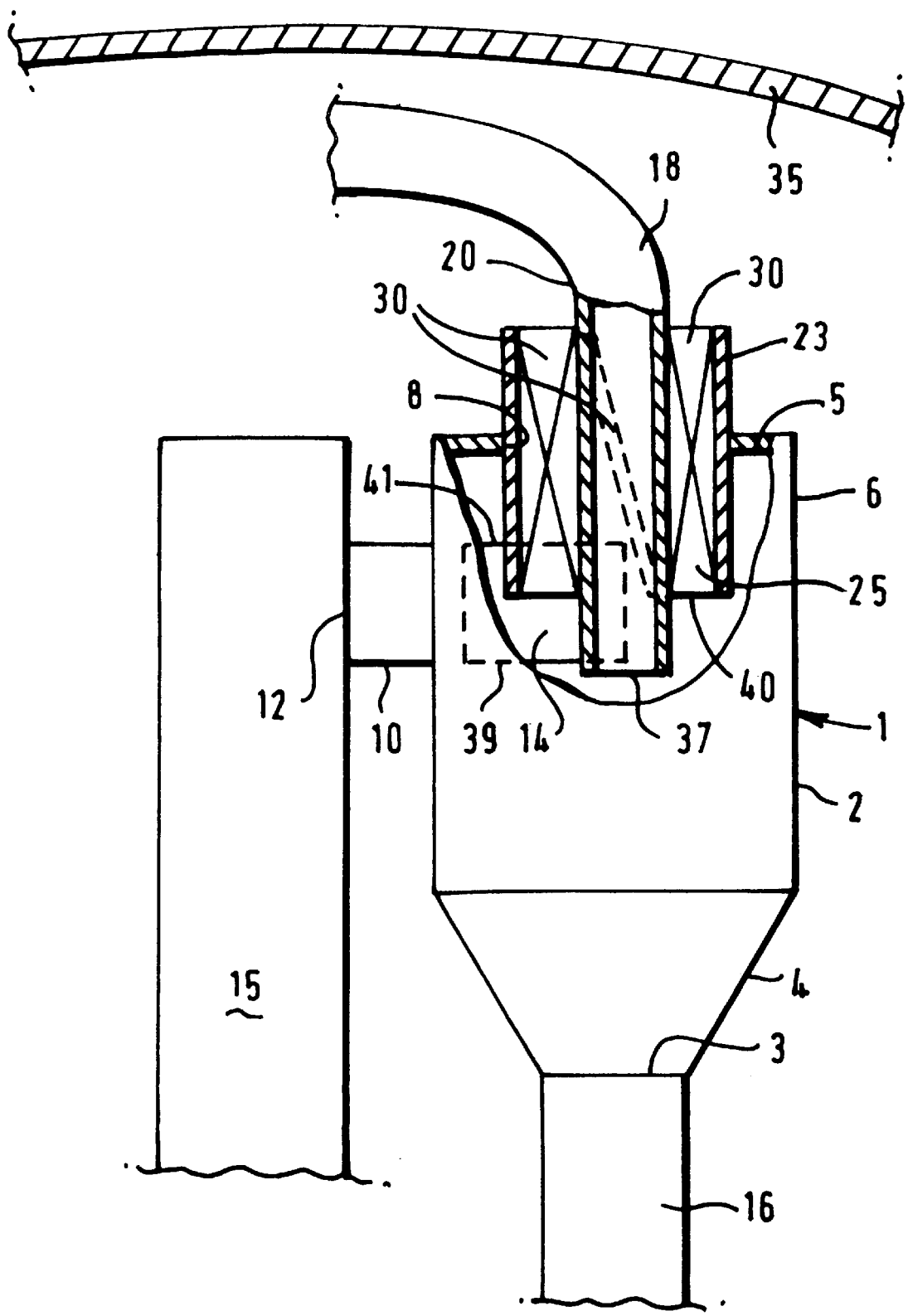

CYCLONE SEPARATOR

FIELD OF THE INVENTION

The present invention relates to a cyclone separator which is applied as a separation stage in a reactor vessel of a reactor riser containing a fluidized-bed catalytic cracking plant.

BACKGROUND OF THE INVENTION

A fluidized-bed catalytic cracking plant includes a reactor vessel, a vertical reactor riser having an upper outlet which is in fluid communication with a separator system arranged in the reactor vessel, and a regenerator vessel. During normal operation, regenerated catalyst particles and hydrocarbonaceous feed are supplied to the inlet end of the reactor riser in which catalytic cracking of the feed takes place to form a mixture of gaseous product and catalyst particles. The mixture leaves the reactor riser at a high temperature of between 500 and 540° C. or higher. The mixture of gaseous product and catalyst particles is passed into the separator system where gaseous product is separated from catalyst particles. The gaseous product is removed from the upper end of the reactor vessel, and the catalyst particles are discharged to the lower part of the reactor vessel where they are stripped. Stripped catalyst particles are passed to the regenerator vessel where coke deposited on the particles during cracking is burnt-off at a high temperature to obtain combustion products and regenerated catalyst. The combustion products are removed from the upper end of the regenerator vessel and regenerated catalyst is re-used.

Such a fluidized-bed catalytic cracking plant is described in European patent application publication No. 488,549. The known separator system comprises a cyclone separator and an auxiliary cyclone separator to provide a two-stage separation. The cyclone separator comprises a vertical housing open at its lower end provided with a cover at its upper end having a central opening, an inlet duct for tangential entry of a mixture of gas and catalyst particles from the outlet of the riser reactor, a particles outlet duct communicating with the open lower end of the vertical housing, and a gas outlet duct having a vertical section which extends through the central opening in the cover and which has an outer diameter which is smaller than the diameter of the central opening. The central opening and the outer surface of the gas outlet duct define an annular inlet port.

The cyclone separator is arranged in the upper part of the reactor vessel, so that during normal operation stripping gas present in the reactor vessel can be drawn into the cyclone separator through the annular inlet port by the difference in pressure between the interior of the reactor vessel and the interior of the cyclone separator.

It is an object of the present invention to improve the efficiency of the known cyclone separator in particular at the level in the cyclone separator where the separation efficiency is low.

DESCRIPTION OF THE INVENTION

To this end the cyclone separator according to the present invention comprises a vertical housing open at its lower end provided with a cover at its upper end having a central opening, an inlet duct for tangential entry of a mixture of gas and catalyst particles from the outlet of a riser reactor of a fluidized-bed catalytic cracking plant, a particles discharge duct communicating with the open lower end of the vertical housing, and a gas outlet duct having a vertical section which extends through the central opening in the cover, which cyclone separator further comprises an open-ended pipe arranged in the central opening so as to define an annular gas inlet conduit between the outer surface of at least part of the vertical section of the gas outlet duct and the inner surface of the open-ended pipe, and swirl imparting means arranged in the annular gas inlet conduit.

The invention will now be described by way of example in more detail with reference to the accompanying drawing showing schematically a partial longitudinal section of the cyclone separator of the present invention.

BRIEF DESCRIPTION OF THE DRAWING

FIG. 1 is a view of the cyclone separator of this invention.

DETAILED DESCRIPTION OF THE INVENTION

The cyclone separator 1 of the present invention comprises a vertical housing 2 which has a discharge opening 3 at its lower end 4 and which is provided with a cover 5 at its upper end 6. The cover 5 has a central opening 8.

The cyclone separator 1 further comprises an inlet duct 10 extending between the upper outlet opening 12 of a riser reactor 15 and the inlet opening 14 of the cyclonic separator 1 for tangential entry of a mixture of gas and catalyst particles into the cyclonic separator 1. It also comprises a particles discharge duct 16 communicating with the discharge opening 3 in lower end 4 of the vertical housing 2, and a gas outlet duct 18.

The gas outlet duct 18 has a vertical straight section 20 which extends through the central opening 8 in the cover 5.

The cyclone separator further comprises an open-ended pipe 23 fixed in the central opening 8, wherein an annular gas inlet conduit 25 is defined between the outer surface of the lower part of the vertical section 20 of the gas outlet duct 18 and the inner surface of the open-ended pipe 23. In the annular gas inlet conduit 25 swirl imparting means in the form of swirl vanes 30 are arranged.

The cyclone separator 1 of the present invention is arranged in the upper part 23 of a reactor vessel. Since such a reactor vessel is well known, it will not be discussed in detail and only its roof 35 is shown. As a fluidized-bed catalytic cracking plant is well known, other parts of such a plant are not shown.

During normal operation a mixture of gaseous product and catalyst particles leaves the reactor riser 15 through opening 12. The mixture is drawn into the inlet duct 10 which opens into the housing 2 so that the mixture enters tangentially into the upper end 6 of the housing 2 of the cyclone separator 1. As a result there is a swirling mixture within the housing 2, and gaseous product is removed from the housing 2 through gas outlet duct 18. Catalyst particles fall to the lower end 4 of the housing 2, and they are discharged via the particles discharge duct 16. The discharged catalyst particles are collected in the lower part (not shown) of the reactor vessel where product adhered to the particles is stripped off by means of stripping gas supplied to the lower part of the reactor vessel. As a result a gaseous mixture of stripping vapor and stripped product passes upwards towards the dilute phase zone in the upper part of the reactor vessel under the roof 35.

This gaseous mixture also contains small amounts of entrained catalyst particles, and these catalyst particles have to be removed from the gaseous mixture. To this end a gaseous mixture is drawn into the upper end 6 of housing 2 through the annular gas inlet conduit 25. The swirl imparting means in the form of swirl vanes 30 will impart a swirling motion on the gaseous mixture, and in this way initial separation of entrained catalyst particles is effected, which separation continues as the mixture descends in housing 2.

Suitably the swirl imparting means 30 are so arranged that the direction of rotation which they impart is the same as the direction of rotation of the mixture of gaseous product and catalyst particles from the reactor riser 15, so that the latter swirl is amplified which further improves the overall efficiency of the cyclone separator 1.

The ratio of the outer diameter of the vertical section 20 to the diameter of the central opening 8 is suitably in the range of from 0.3 to 0.7.

The lower end 37 of the gas outlet duct 18 is located below the lower edge 39 of the inlet opening 14. However, the open-ended conduit 23 does not extend that far into the cyclone separator 1; it only extends to part of the height of the inlet opening 14. The distance between the lower end 40 of the open-ended conduit 23 and the upper edge 41 of the inlet opening 14 is between 10% and 60% of the height of the inlet opening 14. This is done to maximize the effect which the rotation imparted by the swirl imparting means 30 has on the fluid leaving opening 14.

To accommodate differences in thermal expansion between the housing 2 and the gas outlet duct 18, the swirl imparting means 30 are either fixed to the inner surface of the open-ended pipe 23 or to the outer surface of the vertical section 20 of the gas outlet duct 18, but not fixed to both surfaces.

The number of swirl vanes 30 is suitably between 2 and 8, very suitably between 3 and 6.

The gas outlet duct 18 can be connected directly to a plenum chamber (not shown) which is provided with a gas outlet (not shown) extending through the roof 35, in which case the separator system includes one separation stage only. In an alternative embodiment the gas outlet duct 18 can be connected to an auxiliary cyclone separator (not shown), of which the gas outlet which opens into the plenum chamber, in which case the separator system includes two separation stages.

The upper end of the reactor riser 15 can be arranged in the reactor vessel (as shown in the Figure), or it can be located outside the reactor vessel, so that the inlet duct has to extend through the side wall of the reactor vessel.

I claim:

1. A cyclone separator comprising a vertical housing having an open lower end, a covered upper end and a central opening, an inlet duct for tangential entry of a mixture of gas and catalyst particles from an outlet of a riser reactor of a fluidized-bed catalytic cracking plant, a particles discharge duct communicating with said open lower end of the vertical housing, and a gas outlet duct having a vertical section which extends through the central opening in the cover, wherein said cyclone separator further comprises an open-ended pipe arranged in the central opening so as to define an annular gas inlet conduit situated between the outer surface of at least part of the vertical section of said gas outlet duct and an inner surface of said open-ended pipe, and swirl imparting means arranged in the annular gas inlet conduit to impart a swirling motion on the gaseous mixture and wherein the lower end of said gas outlet duct is located below the lower edge of said inlet duct and the lower end of said open-ended conduit lies between the upper and lower edges of said inlet duct.

* * * * *